DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 25, 1972

900 O.G. 1233

T900,028
METHOD FOR PROTECTING PHOTOGRAPHIC FILM AGAINST ALDEHYDES

Kent R. Rush, Rochester, N.Y. 14626

Filed July 1, 1971, Ser. No. 159,028
**Int. Cl. G03c *1/76***
U.S. Cl. 96—74
No Drawing. 38 Pages Specification

Adverse sensitometric effects resulting from contamination of color photographic elements containing silver halide emulsion layers with aldehyde vapor prior to exposure and processing can be substantially reduced or eliminated by incorporating into non-light sensitive layers as aldehyde scavengers certain 1,3-disubstituted pyrazolones or benzoylacet-o-alkoxyanilides exemplified by compounds of the formulae

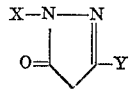

or

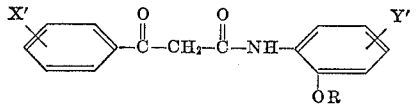

wherein

X is an aryl group;
Y is a carbonamido group;
R is an alkyl group;

either one of X′ or Y′ is defined as a hydrogen atom, the other then being defined as a substituent group having the formulae $$—NH—CO—A—O—R_1 \text{ or } —NH—CO—R_2$$

wherein A is a linear or branched alkylene group; and $R_1$ and $R_2$ are defined as an aryl group.

Such aldehyde scavengers in the photographic elements reduce color fog on color processing.